Patented Feb. 14, 1950

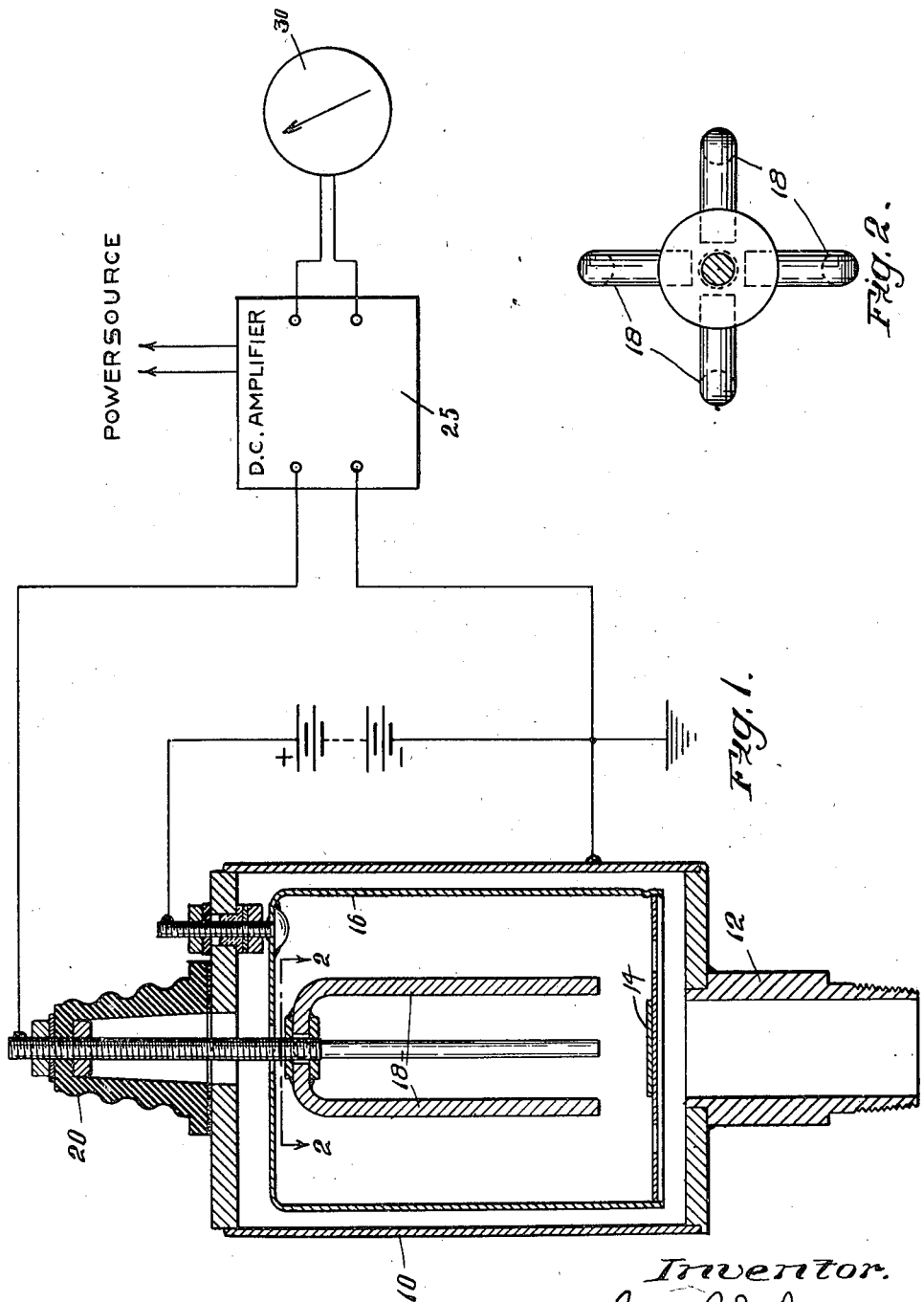

2,497,213

UNITED STATES PATENT OFFICE 2,497,213

PRESSURE GAUGE

James R. O. Downing, Boston, Mass., assignor to National Research Corporation, Boston, Mass., a corporation of Massachusetts Application May 22, 1945, Serial No. 595,154

12 Claims. (Cl. 175—183)

This invention relates to pressure gauges and more particularly to vacuum gauges of the ionization type and to methods of measuring the pressures of gases, vapors and the like.

It is an object of the invention to provide wholly reliable, high precision manometers of the ionization type useful in measuring pressures of gases and vapors in selected ranges lying anywhere between about one micron of mercury and several atmospheres, by the use of the novel method of pressure measurement of this invention.

Gauges in accordance with the invention utilize ambient temperature sources of ionizing agent activity, exemplified by such radioactive materials as radium, and are adapted to measure the rate of ionization resulting from the passage of ionizing agents emitted from such materials through the gas whose pressure is to determined.

Known vacuum gauges of the ionization type utilize, as sources of ionizing activity, electrons emitted from incandenscent filaments. Such gauges have a limited field of use; they are incapable of satisfactory operation in the measurement of pressures exceeding about one micron of mercury because of accompanying destructive disintegration of the filament at such pressures, and, even in their limited field of usefulness, their measurements are far from precise. A particularly apparent defect is that radiation of heat from the filament affects the temperature or structure and hence the pressure of the gas that is being measured, thus introducing errors in the true measurement; accurate readings are inherently impossible. Also, uniformity in rate of electron emission, a factor requisite for consistent operation, is difficult to control in hot filament emitters.

Instruments of this invention do not possess the restrictive characteristics and defects of hot filament ionization gauges. Their sources of ionizing agent activity are not subject to destructive disintegration at any pressure and operate at ambient temperature to ionize surrounding gases and the activity of their sources is constant and independent of temperature changes. Thus, their field of usefulness, so far as pressure range is concerned, is substantially unrestricted with respect to pressure measurement both of gases and of condensable vapors, and their operation is not accompanied by error-imparting variation of the pressure to be measured through the influence of filament heat radiation or by fluctuation in source activity. Furthermore, taking advantage of the fact that the specific ionization of gases and vapors by such ambient temperature constant sources of ionizing agent activity is a linear function of gas pressure, gauges of this invention may be built wherein, for selected ranges within pressures running from about 5 microns of mercury to several atmospheres, conversion of the ionization current into a pressure reading is a matter of simple calibration or of electrical amplification and calibration, the ionization current being essentially (to within 2%) a linear function of the gas pressure throughout the selected range of pressures for which the gauge is designed.

A typical gauge of this invention comprises an ambient temperature source of ionizing agent activity as above described, for instance a given mass of radium, positioned to project or radiate ionizing agents, for example, alpha particles in the case of radium, at a constant rate or substantially so into a fixed volume of gas the pressure of which is to be measured, along paths of fixed mean dimension. The gauge includes an ion collector which operates to collect ions formed by such ionizing agent activity and electrical measuring instrumentalities responsive to the rate of ion collection at the ion collector for determining the pressure of the gas as a function of the ionization produced by such activity. The electrical instruments may include a meter for recording the rate of ion collection, i. e., the ionization current, or an amplification thereof, as a function of the pressure of the gas being measured. In properly designed gauges, the rate of ion collection at the collector equals or is essentially a linear function of the rate of ion production in the gas within the selected range of pressures for which the gauge is designed and hence, the rate of ion production being essentially a linear function of the pressure of the gas, the response of the meter is also essentially a linear function of the pressure of the gas.

Such a gauge construction is diagrammatically illustrated in the accompanying drawing, wherein Fig. 1 is a diagrammatic representation of a gauge of this invention, and Fig. 2 is a cross-sectional view taken along line 2—2 of Fig. 1.

The gauge includes a vacuum tight cylindrical chamber formed within a casing 10 having a mechanical coupling 12 for connecting the gauge to a vacuum system or other source of gas or vapor the pressure of which is to be measured. This coupling is shown in the drawing as a conventional threaded pipe. The reference 14 diagrammatically indicates an ambient temperature source of ionizing agent activity mounted on the interior of an inner metallic shield 16.

Ion collector 18 extends into casing 10 through a high impedance ($10^{12}$ ohms or greater for the gauge hereinafter described) vacuum type insulator 20 which acts to support the collector.

The inner shield 16 is reversely, for example positively, charged with respect to the ion collector 18, as by the battery circuit shown, so that ions formed in the chamber by the collision of ionizing agents, radiated from source 14, with gas atoms in the chamber, will be driven to ion collector 18. A 20–30 bolt positive potential has been found to be suitable. Collection of the ions at collector 18 passes the ionization current into the circuit shown to a D. C. amplifier diagrammatically indicated at 25 energized from a suitable power source as indicated. The output of the amplifier is interpreted by a meter or recorder indicated at 30.

Where radium, either as a metal or as a metallic salt, is used as the source of ionizing agent activity, it is preferred to arrange the source so that the radium component thereof is maintained in equilibrium with its immediate decay products. By this expedient, a smaller mass of radium-containing source material can be utilized by reason of the fact that the alpha particle activity of radium maintained in equilibrium with its immediate decay products is approximately four times the alpha particle activity of a radium-containing source not so maintained. A preferred means of maintaining the radium in equilibrium with its immediate decay products is to deposit radium, as from a radium bromide solution, onto a metallic foil or plaque and then to seal the surface of the radium to prevent emanation of the primary decay product of radium—the gas, radon—and therefore to preserve within the source this primary decay product thereby maintaining, at the source, the potential ionizing agent activity of this primary decay product and its successive decay products. A preferred seal is a film of rhodium evaporated over the radium. Rhodium has been found to be particularly inert chemically and physically to such a source, but other metallic foils or evaporated layers, such as of gold, nickel or aluminum, may be utilized in lieu of rhodium. Such other materials have been found however to be inferior to rhodium by reason of insufficient inertness either to the radium or to traces of mercury which may be present in the gauge chamber.

While gauges of this invention may be constructed and then calibrated against a standard pressure gauge, certain principles governing their physical construction should be borne in mind, particularly where linear response is expected. Theoretically stated, these principles are as follows:

The expression for the ionization current produced by alpha particle activity in air is approximately the following:

$$I = KeLNP \quad (I)$$

where

K represents the number of ion pairs produced per alpha particle per centimeter of path length at a gas pressure of one millimeter of mercury, e represents the electronic charge (e. s. u.), L represents the mean distance in centimeters between the source of alpha particle activity and the limits of the ionization chamber, N represents the source activity in alpha particles per second, and P represents the pressure in millimeters of mercury.

Known scientific measurements have established that an alpha particle in its passage through air at standard temperature and pressure produces about $2.5 \times 10^4$ ion pairs per centimeter of path length so that the value K for air at one millimeter of mercury pressure may be taken for the purposes of the present calculations as $$K = \frac{2.5 \times 10^4}{760} = 32.9 \quad (II)$$

The electronic charge $$e = 4.8 \times 10^{-10} \text{ e. s. u./sec.}$$
$$= \frac{4.8 \times 10^{-10}}{3 \times 10^{10}} \text{ e. m. u./sec.}$$
$$= 1.6 \times 10^{-20} \text{ abamperes}$$
$$= 1.6 \times 10^{-19} \text{ amperes} \quad (III)$$

Substituting these values in Equation I:

$$I = 32.9 \times 1.6 \times 10^{-19} LNP$$
$$= 5.25 \times 10^{-18} LNP \quad (IV)$$

Accordingly, ionization gauges of this invention require a proper choice of physical dimension (L) in relation to source activity (N) and in relation to the capacity of the current amplifier in order to produce a measurable ionization current (I) for the lowest pressure (P) to be measured. Direct current amplifiers for currents of the order of $10^{-11}$ amperes being available, it has been demonstrated that the physical dimension of the gauge may be such that a pressure as low as one micron of mercury may be measured with the ionizing activity realized from only a fraction of a milligram of radium in equilibrium with its immediate decay products.

For example, a gauge suitable for use in measuring pressures in the range from 0 to 100 microns and giving an essentially linear response in amplifier output running from almost 0 to about 200 micro-amperes, utilizing a direct current amplifier capable of amplifying currents of the order of $10^{-11}$ amperes, has been found to operate satisfactorily when the value of L as above given has been about 5.5 centimeters and the mass of radium in equilibrium with its immediate decay products is of the order of 0.2 milligram, the amplifier gain being such as to give, at 100 microns of pressure, full scale (200 micro-amperes) deflection of a micro-ammeter. The internal dimensions of the chamber have been 7.6 cms. in length and 6 cms. in diameter. A suitable amplifier is one substantially of the type described by S. Roberts in R. S. I. 10, 181–183 (1939). By incorporation of suitable plural circuits in the amplifier system to reduce the amplification factor and plural calibration of the ammeter, the same gauge may be selectively utilized for measurement of larger pressures exceeding 100 microns, for instance giving full scale deflection (200 micro-amperes) at 1 millimeter and at 10 millimeters of pressure. In such cases, linearity it found at values above about 5 microns pressure up to the full scale reading corresponding to 10 millimeters of pressure.

In general, the larger the mass of radium and consequent greater ionizing agent activity, the greater ionization current produced in a gauge of fixed chamber dimension for a given gas pressure. However, it is desirable to limit the mass of radium to an amount consistent with safety and economy. Confinement of decay products at the source is therefore helpful as it increases the activity almost fourfold without increasing the mass. As stated above, it has been experimentally found that use of an amount of radium (in equilibrium with its immediate decay products) equivalent to a fraction of a millimeter is amply sufficient for gauges designed to measure pressures up to about 10 millimeters. It is desirable, for reasons of safety, that the mass of radium not exceed about .4 milligram.

The minimum amount of radium required in relation to the physical dimensions of the chamber and the capacity of the amplification circuit may be theoretically calculated from Equation IV. For example, if the capacity of the amplifier is such that it is desired to produce an ionization current of the order of $10^{-10}$ amperes at one millimeter of pressure, the mass of radium theoretically required, in the case of a gauge having physical dimensions producing a value of L equal to 5.5 centimeters, may be calculated with the aid of Equation IV, after solving for N, as follows:

$$N = \frac{I}{5.25 \times 10^{-18} PL}$$
$$= \frac{I}{5.25 \times 10^{-18} \times 1 \times 5.5} \quad (V)$$
$$= \frac{I}{2.88 \times 10^{-17}}$$
$$= \frac{10^{-10}}{2.88 \times 10^{-17}}$$
$$= 3.47 \times 10^6 \text{ alpha particles per second required to enter ionization chamber}$$

According to known scientific measurements, one gram of radium emits about $3.64 \times 10^{10}$ alpha particles per second and, when in equilibrium with its immediate decay products, emits about $3.64 \times 10^{10} \times 4$ alpha particles per second. Thus if all the alpha particles from a mass of radium positioned as shown in the accompanying drawing were emitted into the ionization chamber, it would require $$\frac{3.47 \times 10^6}{3.64 \times 10^{10} \times 4} = 2.38 \times 10^{-5}$$

grams of radium to produce the required activity for an ionization current of $10^{-10}$ amperes at one millimeter pressure of mercury in a chamber providing a mean path dimension of 5.5 centimeters. However, due to the geometric position of the radium relative to the ionization chamber, not more than 50% of the alpha particles produced will be emitted in the direction of the ionization chamber and a portion of these, probably about 10% thereof, will never reach the ionization chamber because of loss of energy in passing through the rhodium or other radon confining material. Accordingly, the figure $2.38 \times 10^{-5}$ grams must be multiplied by a factor of at least 2.5 in order to produce the theoretical amount of radium for proper operation of the gauge as above described. In practice, $1.7 \times 10^{-4}$ grams of radium has been used since such amount is not excessive from the standpoint of either cost or safety, and it produces slightly larger currents of the order of $2 \times 10^{-10}$ amperes at 1 millimeter of pressure in the above described type of chamber.

In a similar way, it can be calculated that if it is desired to produce a still greater current of $10^{-9}$ amperes at one millimeter of gas pressure, the theoretical minimum amount of radium metal in the source should be $2.5 \times 2.38 \times 10^{-4}$ grams. This is more radium than is required in view of the satisfactory amplifiers for lesser currents.

As is obvious from study of the above Equation IV, the value L may be varied to increase or decrease the rate of ion production secured with a given radioactivity at the source. In general, the larger the value of L the greater the rate of ion production with the limit that the value L should always be less than the mean residual range (mean total range minus the equivalent air thickness of the enclosing decay product confining film) of the ionizing agents at the maximum pressure which the gauge is designed to measure and should be substantially below this value where it is desired to attain maximum ionization for a given source mass.

It has also been established that where linear response is desired, the distance between the ion collector and the casing should be small to prevent the ions from becoming neutralized by recombination before reaching the ion collector. With recombination, the rate of ion collection at the collector will not accurately reflect the actual rate of ion production created in the gas and hence there will be deviation from linear response. For this reason, it is desirable to utilize a plurality of ion collectors so that the travel of the ions from the point of ionization to the ion collector will be minimized, thereby minimizing the likelihood of recombination. The mean total range of alpha particles emitted in air from radium and its immediate decay products at standard temperature and pressure has been determined as of the order of 3.5 centimeters. The confining film may reduce this range by more than 50%, so that in atmospheric or greater pressure gauges both the chamber dimensions and the collector spacing from the casing must be small as shown.

In the above equations, K has been given a value of 32.9 based upon the production by alpha particles in their passage through air of about $2.5 \times 10^4$ ion pairs per centimeter of path length at standard temperature and pressure. Where these equations are utilized in connection with condensable vapors or gases other than air, K must be given a value representing the number of ion pairs produced by alpha particles per centimeter of path length in their passage at standard temperature and pressure through the particular vapor or gas being measured.

Similarly, in cases where the ionizing agent is other than alpha particles, suitable values for K and N derived from the physical constants of the particular ionizing agent being utilized must be substituted in the above equations, and special design based thereon may be called for.

It is contemplated that gauges of this invention may be used as sensitive barometers and altimeters. The devices have been found to be remarkably stable and free from drift and to give remarkably accurate and precise readings.

I claim:

1. A gas pressure gauge operable at pressures above atmospheric pressure without damage thereto and comprising an ionization-chamber-defining casing, means for maintaining said casing at a predetermined potential, an ion collector within the ionization chamber defined by said casing, means for maintaining said ion collector at a potential different than said casing, a radioactive material whose rate of emission of ionizing agents is substantially constant and substantially independent of temperature and electric field therearound, said radioactive material being positioned to radiate ionizing agents along predetermined paths, a substantial proportion of said paths extending beyond said collector to said casing, means for amplifying current created by ions collected at said collector, and means for indicating the magnitude of said amplified current and thus the gas pressure within said casing.

2. A pressure gauge as claimed in claim 1 wherein the ion current collected at the collector, when measuring air pressure, is substantially expressed by the formula $I=5.25 \times 10^{-13} LNP$, wherein I is ionization current in amperes, P is the pressure in millimeters to be measured, N represents the residual activity of said radioactive material in alpha particles per second directed into the ionization chamber, and L represents the mean distance in centimeters between the source of alpha particles and the limits of the ionization chamber, said amplifier means being capable of amplifying currents as small as $10^{-13}$ amperes to currents on the order of $10^{-6}$ amperes, said source having an alpha particle radiation sufficient to provide an ionization current I of about $10^{-13}$ at the lowest pressure to be measured, and L being less than the mean residual range of the alpha particles at the maximum pressure to be measured whereby said gauge has a substantially linear response over a range of pressures up to said maximum pressure.

3. A pressure gauge as claimed in claim 1 wherein said radioactive material comprises radium.

4. A pressure gauge as claimed in claim 1 wherein said radioactive material comprises radium in equilibrium with its immediate decay products.

5. A pressure gauge as claimed in claim 1 wherein said radioactive material has gaseous decay products and means associated therewith for confining said gaseous decay products to maintain said radioactive material in equilibrium with its decay products.

6. A gas pressure gauge operable at pressures above atmospheric pressure without damage thereto, said gauge comprising a first electrode defining an ionization chamber, a second electrode within said chamber, means for maintaining a potential difference between said electrodes so that positive ions are collected by one of said electrodes and negative ions are collected by the other of said electrodes, means comprising a radioactive material whose rate of emission of ionizing agents is substantially constant and substantially independent of temperature and electric field therearound, said radioactive material being positioned to radiate ionizing agents into the space between said two electrodes to ionize gas molecules within said ionization chamber, and means for amplifying and indicating current created by ions collected at one of said electrodes to give a measurement of the pressure within the gauge.

7. A gas pressure gauge operable at pressures above atmospheric pressure without damage thereto, said gauge comprising a first electrode defining an ionization chamber, a second electrode within said chamber, means for maintaining a potential difference between said electrodes so that positive ions are collected by one of said electrodes and negative ions are collected by the other of said electrodes, means comprising a radioactive material whose rate of emission of alpha particles is substantially constant and substantially independent of temperature and electric field therearound, said radioactive material being positioned to radiate alpha particles into the space between said two electrodes to ionize gas molecules within said ionization chamber, and means for amplifying and indicating current created by ions collected at one of said electrodes, said radioactive material being positioned so that the mean dimension from the radioactive material to the limits of the ionization chamber is less than the residual path length of the alpha particles at the highest pressure to be measured by said gauge, whereby said gauge has a linear response over a range of pressures up to said maximum pressure.

8. The gauge of claim 6 wherein said radioactive material is carried by one of said two electrodes.

9. The gauge of claim 6 wherein said second electrode comprises a plurality of fingers in said chamber, said fingers being electrically connected to a common lead entering said chamber.

10. The gauge of claim 6 wherein said second electrode has an area normal to the paths followed by said ionizing agents that is small relative to the area of said first electrode normal to said paths.

11. The gauge of claim 6 wherein said radioactive material is maintained at the same electrical potential as one of said two electrodes.

12. The gauge of claim 6 wherein there is provided a light-opaque means surrounding said chamber.

JAMES R. O. DOWNING.

REFERENCES CITED

The following references are of record in the file of this patent:

UNITED STATES PATENTS

| Number | Name | Date |
|---|---|---|
| 824,637 | De Forest | June 26, 1906 |
| 1,649,016 | Buckley | Nov. 15, 1927 |
| 1,808,709 | Blake | June 2, 1931 |
| 2,032,545 | McElrath | Mar. 3, 1936 |

FOREIGN PATENTS

| Number | Country | Date |
|---|---|---|
| 536,594 | Great Britain | May 20, 1941 |

Certificate of Correction

Patent No. 2,497,213                                                          February 14, 1950

JAMES R. O. DOWNING

It is hereby certified that errors appear in the printed specification of the above numbered patent requiring correction as follows:

Column 4, line 70, for the words "it found" read *is found*; column 7, line 42, after "means" insert *are*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*